United States Patent
Rembold et al.

(10) Patent No.: US 6,615,807 B2
(45) Date of Patent: Sep. 9, 2003

(54) METHOD AND APPARATUS FOR COOLING A FUEL INJECTION SYSTEM

(75) Inventors: Helmut Rembold, Stuttgart (DE); Udo Hafner, Ludwigsburg (DE); Winfried Moser, Ludwigsburg (DE); Matthias Philipp, Vaiihngen/enz (DE); Klaus Joos, Walheim (DE); Karl Gmelin, Flein (DE); Bernd Herrmann, Sachsenheim (DE); Volkmar Goldschmitt, Asperg (DE); Thomas Frenz, Noerdlingen (DE); Ruediger Weiss, Moetzingen (DE); Edmund Schaut, Friolzheim (DE); Uwe Mueller, Hemmingen (DE); Markus Amler, Leonberg-Gerbersheim (DE); Hansjoerg Bochum, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/013,534

(22) Filed: Dec. 13, 2001

(65) Prior Publication Data

US 2002/0124834 A1 Sep. 12, 2002

(30) Foreign Application Priority Data

Dec. 13, 2000 (DE) .......................................... 100 61 987

(51) Int. Cl.$^7$ ................................................ F02M 37/04
(52) U.S. Cl. ...................................... 123/516; 123/541
(58) Field of Search ................................. 123/456, 514, 123/179.17, 446, 541, 516

(56) References Cited

U.S. PATENT DOCUMENTS

| | | | | | |
|---|---|---|---|---|---|
| 4,984,554 | A | * | 1/1991 | Ariga et al. | 123/516 |
| 5,074,272 | A | * | 12/1991 | Bostick et al. | 123/514 |
| 5,558,068 | A | * | 9/1996 | Kunishima et al. | 123/516 |
| 5,911,208 | A | * | 6/1999 | Furusawa et al. | 123/506 |
| 5,918,578 | A | * | 7/1999 | Oda | 123/456 |
| 6,021,763 | A | * | 2/2000 | Yoshihara et al. | 123/516 |
| 6,058,912 | A | * | 5/2000 | Rembold et al. | 123/516 |
| 6,209,522 | B1 | * | 4/2001 | Onishi et al. | 123/458 |
| 6,345,608 | B1 | * | 2/2002 | Rembold et al. | 123/506 |

* cited by examiner

*Primary Examiner*—Carl S. Miller
(74) *Attorney, Agent, or Firm*—Ronald E. Greigg

(57) ABSTRACT

A method for cooling a fuel injection system and fuel injection systems are proposed that improve the hot-starting performance of the internal combustion engine.

24 Claims, 4 Drawing Sheets a)

b)

c)

d)

METHOD AND APPARATUS FOR COOLING A FUEL INJECTION SYSTEM

BACKGROUND OF THE INVENTION

1. Field of the Invention

The invention relates to a method for cooling a fuel injection system and to a fuel injection system for an internal combustion engine.

2. Description of the Prior Art

Injection systems of internal combustion engines, especially if they are operated with Otto fuel tend to form vapor bubbles under certain conditions. For instance, it can happen that the high-pressure fuel pump and/or the common rail, after the shutoff of the engine, heat up so much that the boiling temperature of the fuel is reached or exceeded. The consequence is vapor bubbles in the fuel injection system, which in a so-called "hot start" of the engine that occurs soon after shutoff impair the starting performance of the engine.

From German Patent Disclosure DE 195 39 885 A1, it is known, in order to improve the hot-starting performance of an internal combustion engine, to flush the fuel injection system briefly with relatively cool fuel upon starting and then to raise the pressure in the fuel feed line.

OBJECT AND SUMMARY OF THE INVENTION

The object of the invention is to furnish a method for cooling a fuel injection system and to furnish a fuel injection system, which further improve the hot-starting performance of the engine.

According to the invention, this object is attained by a method for cooling a fuel injection system for internal combustion engines, having a prefeed pump that pumps fuel from a tank via a feed line into a high-pressure region, the high-pressure region including a high-pressure pump, having a return line for removing excess fuel from the high-pressure region, and having a connecting line, connecting the feed line and return line, the flow through the connecting line being controllable by means of a scavenging valve, in which the scavenging valve is closed when upon turn-on of the engine a turn-on criterion has been reached, at least parts of the high-pressure region are scavenged with fuel from the fuel tank, and the scavenging valve is opened as soon as a turn-off criterion is reached.

In this method of the invention, the pressure elevation and the scavenging process begin simultaneously, so that the removal of any vapor bubbles that may be present from the high-pressure region and the compression of these bubbles occur simultaneously. The result is improved hot-starting performance of the engine.

Variants of the invention provide that a characteristic temperature is used as the turn-on criterion, in particular the temperature of the fuel in the high-pressure region and/or the temperature of components of the fuel injection system and/or the temperature of the air in the surroundings of the fuel injection system. This characteristic temperature can be measured or calculated by means of model calculation. By using a characteristic temperature as the turn-on criterion, it is assured that whenever there is a risk of vapor bubble development, a scavenging operation and compression of the vapor bubbles by an elevation of pressure in the fuel injection system is tripped. On the other hand, unnecessary pressure elevations in the feed line and in the high-pressure region upon engine starting are avoided.

Further features of the method of the invention provide that the scavenging valve is opened in time-controlled fashion, and/or that the scavenging valve is opened as a function of the course over time of the characteristic temperature, so that an unnecessary load on the prefeed pump is avoided and nevertheless, the development of vapor bubbles is suppressed immediately after the hot start of the engine.

Thus by way of example, the scavenging valve can be opened if the characteristic temperature has undershot a predetermined value.

It is also possible for the time during which the scavenging valve remains closed to be defined as a function of the characteristic temperature, and/or for the scavenging valve to be opened as a function of the fuel quantity pumped by the prefeed pump for scavenging purposes, or for the scavenging valve to be opened as a function of the air flow rate aspirated by the engine. In these variants of the method of the invention as well, effective removal and effective compression of the vapor bubbles from the high-pressure region are assured, without overloading the prefeed pump. In addition, a temperature sensor for ascertaining the turn-on criterion can be dispensed with.

The hot-starting performance of an internal combustion engine can be further improved if the scavenging valve is closed as soon as voltage is applied to the terminal of the vehicle. As a result, the pressure elevation occurs at the earliest possible instant, which further improves the hot-starting performance.

In a further feature of the invention, the turn-on criterion is reduced after the fuel tank has been filled, since "fresh" fuel has a lower boiling point than fuel that has been in the tank for a relatively long time.

The object stated at the outset is also attained by a fuel injection system for internal combustion engines, having a control unit, having a prefeed pump that pumps fuel from a tank via a feed line into a high-pressure region, the high-pressure region including at least one high-pressure pump, having a return line for removing fuel from the high-pressure region, the return line having a relief throttle and a low-pressure regulator, in which between the feed line and the return line, a connecting line with a scavenging valve and a mixing line with a check valve are provided; the mixing line discharges into the return line upstream of the connecting line; and the connecting line discharges into the return line upstream of the low-pressure regulator.

This fuel injection system of the invention is very simple in design, since to improve the hot-starting performance, only one connecting line with a scavenging valve and one mixing line with a check valve have to be provided. The pressure control valve presents a flow resistance upon starting of the engine, so that a pressure elevation in the feed line and the high-pressure region ensues as soon as the prefeed pump is in operation and the scavenging valve has closed. To improve the hot-starting performance, all that is needed is to monitor a turn-on criterion and to close the scavenging valve if necessary. Because of the simultaneity of the scavenging and compression of the vapor bubbles, the engine turns over after only a very short time even in a hot start.

In a variant of the invention, a relief throttle is provided between the discharge point of the mixing line and connecting line into the return line, and that the check valve is loaded by a spring. The opening pressure $\Delta_p$ of the check valve, which can also be embodied as a spring-loaded check valve, causes a pressure difference to occur at the relief throttle as soon as the scavenging valve is closed. By a suitable adaptation of the opening pressure $\Delta_p$ of the check valve, the pumping capacity of the prefeed pump, and the opening pressure $\Delta_p$ of the check valve, the scavenging flow in the high-pressure region of the fuel injection system can be adjusted. Because the check valve operates as a function of pressure and need not be triggered by the control unit, the effort: and expense for laying a signal line is omitted, and there is less of a load on the control unit. The control unit can be relieved still further if the scavenging valve is opened when without current.

Further features of the invention provide that the check valve is spring-loaded, so that the opening pressure $\Delta_p$ of the check valve is easily adjustable.

In another variant of the invention, the scavenging valve is open when without current, so that the scavenging valve has to be triggered only in the case of a hot start of the engine.

The above-stated object is also attained by a fuel injection system for internal combustion engines, having a control unit, having a prefeed pump that pumps fuel from a tank via a feed line into a high-pressure region, the high-pressure region including at least one high-pressure pump, having a return line for removing fuel from the high-pressure region, wherein the return line has a check valve and discharges into the feed line, and having a leakage line for removing fuel from the high-pressure region into the tank, in which a check valve is provided in the return line, and a low-pressure regulator is provided in the leakage line.

In this fuel injection system of the invention, the high-pressure pump is permanently cooled, so that both during a hot start and in the heating mode, the formation of vapor bubbles is effectively suppressed. By a suitable adaptation of the pumping capacity of the prefeed pump and the pressure established by the low-pressure regulator in the leakage line, the scavenging quantity can be adjusted such that on the one hand the tank is not unnecessarily heated up, and on the other a more-reliable hot start and hot operation of the engine are assured.

In a further feature of the invention, it is provided that the high-pressure region includes a common rail and a pressure regulating valve, and that the pressure regulating valve regulates the pressure in the common rail by diverting fuel out of the common rail into the return line, so that the common rail can be scavenged as well.

In a further feature of the invention, it is provided that at least one temperature sensor is present, to ascertain the turn-on criterion or criteria or the turn-off criterion or criteria, so that the pressure elevation from hot starting is effected only if there is a risk of vapor bubble formation, and on the other hand, the pressure elevation is not maintained any longer than necessary.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
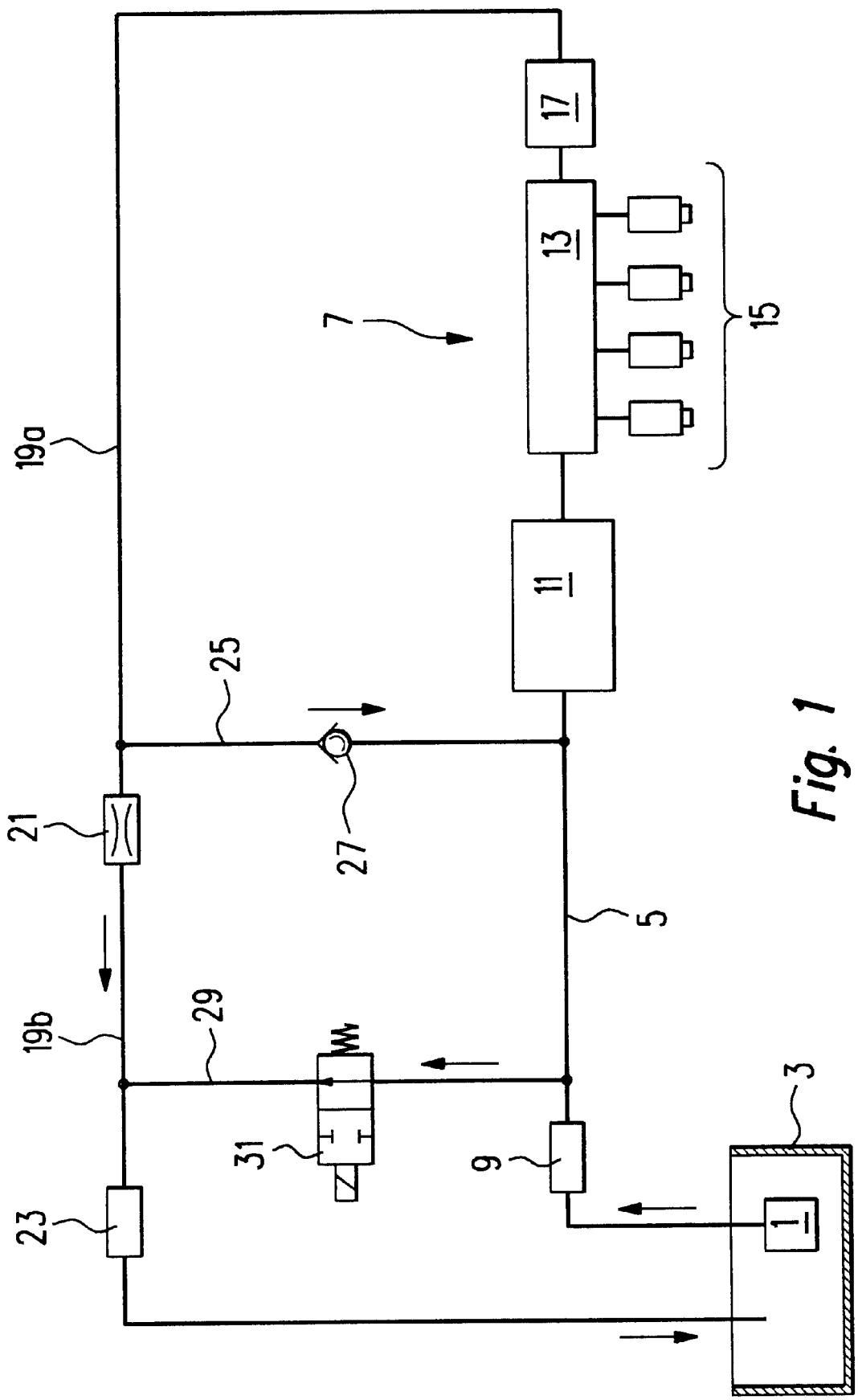
FIG. 1 schematically shows a first exemplary embodiment of a fuel injection system of the invention.

In FIG. 1, a first exemplary embodiment of a fuel injection system of the invention is shown. An electric prefeed pump 1 pumps fuel out of a tank 3 via a feed line 5 to a high-pressure region 7 of the fuel injection system. A filter 9 is built into the feed line 5.

In the exemplary embodiment of FIG. 1, the high-pressure region 7 comprises a high-pressure pump 11, a common rail 13 with injectors 15 connected to it, and a pressure regulating valve 17. In normal operation, the pressure in the common rail 13 is measured by a pressure sensor, not shown. The measured pressure is evaluated by a control unit, also not shown, and taking additional parameters into account, triggers the pressure control valve 17 in such a way that the desired set-point pressure in the common rail 13 is maintained.

The pressure control valve 17 can lower the pressure in the common rail 13 by opening slightly, thus enabling the outflow of fuel from the common rail 13 into a return line 19.

The return line 19 has a relief throttle 21 and a low-pressure regulator 23. The relief throttle 21 divides the return line 19 into two portions 19a and 19b. The relief throttle 21 has the task of limiting the return quantity (scavenging quantity) into the tank. The low-pressure regulator 23 has the task of establishing a virtually constant pressure of 3 to 4 bar, for instance, in the return line 19.

Between the return line and the feed line, upstream of the relief throttle 21, there is a mixing line 25 with a check valve 27. The check valve can also be spring-loaded.

Upstream of the low-pressure regulator 23, there is a connecting line 29 with a scavenging valve 31. The scavenging valve 31 is a 2/2-way valve that is open when without current.

In normal operation of the internal combustion engine, not shown, the scavenging valve 31 is open, so that the fuel pumped by the prefeed pump 1 that is not used by the high-pressure region 7 is pumped into the return line 19 via the connecting line 29. Accordingly, in normal operation the prefeed pump 1 pumps counter to the pressure established by the low-pressure regulator 23.

If in a hot start there is the risk of vapor bubble formation in the high-pressure region 7, then the scavenging valve 31 is closed, so that the pressure in the feed line 5 and in the high-pressure region 7 is independent of the pressure in the portion 19b of the return line 19.

The prefeed pump 1 has a pumping level of 5 to 8 bar, for instance. When the feed line 5 and the high-pressure region 7 are acted upon by that pressure, any vapor bubbles present are compressed, so that the pumping of fuel into the injectors 15 takes place without delay. The prefeed pump 1 is designed such that during normal operation, it always pumps a certain scavenging quantity, which flows back into the tank 3 via the throttle 21. Additionally, when the scavenging valve 31 is closed, scavenging of the high-pressure region 7 also takes place, so that any vapor bubbles present there are flushed out of the high-pressure region 7.

The mixing line 25 and the check valve 27, in conjunction with the relief throttle 21, have the effect that in the portion of the return line 19 located upstream of the relief throttle 21, a higher pressure than the pressure established by the low-pressure regulator 23 prevails during the scavenging operation. At the onset of pumping of fuel by the prefeed pump 1 into the high-pressure region 7, with the scavenging valve 31 closed, the pressure control valve 17 does not yet regulate the pressure in the common rail 13, since the pressure in the common rail 13 is not high enough. In this operating state, the pressure control valve 17 presents a flow resistance, which contributes to the pressure elevation in the feed line 5 and in the high-pressure region 7.

This means that the pressure furnished by the prefeed pump 1 prevails in both the high-pressure region 7 and the portion 19a of the return line 19 located upstream of the relief throttle 21. This pressure is limited, when the scavenging valve 31 is closed, by means of a pressure limiting valve, not shown separately but integrated with the prefeed pump 1. Since the check valve 27 in the mixing line 25 does not open until a certain pressure difference $\Delta_P$ prevails between the portion 19a of the return line 19 and the feed line, the fuel during the scavenging operation flows out solely through the relief throttle 21. Since the relief throttle 21 causes a pressure reduction, and the pressure in the portion 19b of the return line is regulated to approximately 3 to 4 bar by the low-pressure regulator 23, the pressure in the portion 19a of the return line is higher than in the portion 19b. By the appropriate adaptation of the relief throttle 21, the opening pressure $\Delta_p$ of the check valve 27, and the pumping capacity of the prefeed pump 1, the desired scavenging flow can be established. The scavenging flow also has a cooling effect, since the high-pressure region 7 is flushed with cool fuel from the tank 3 and is thus cooled as well.

Figure 2:
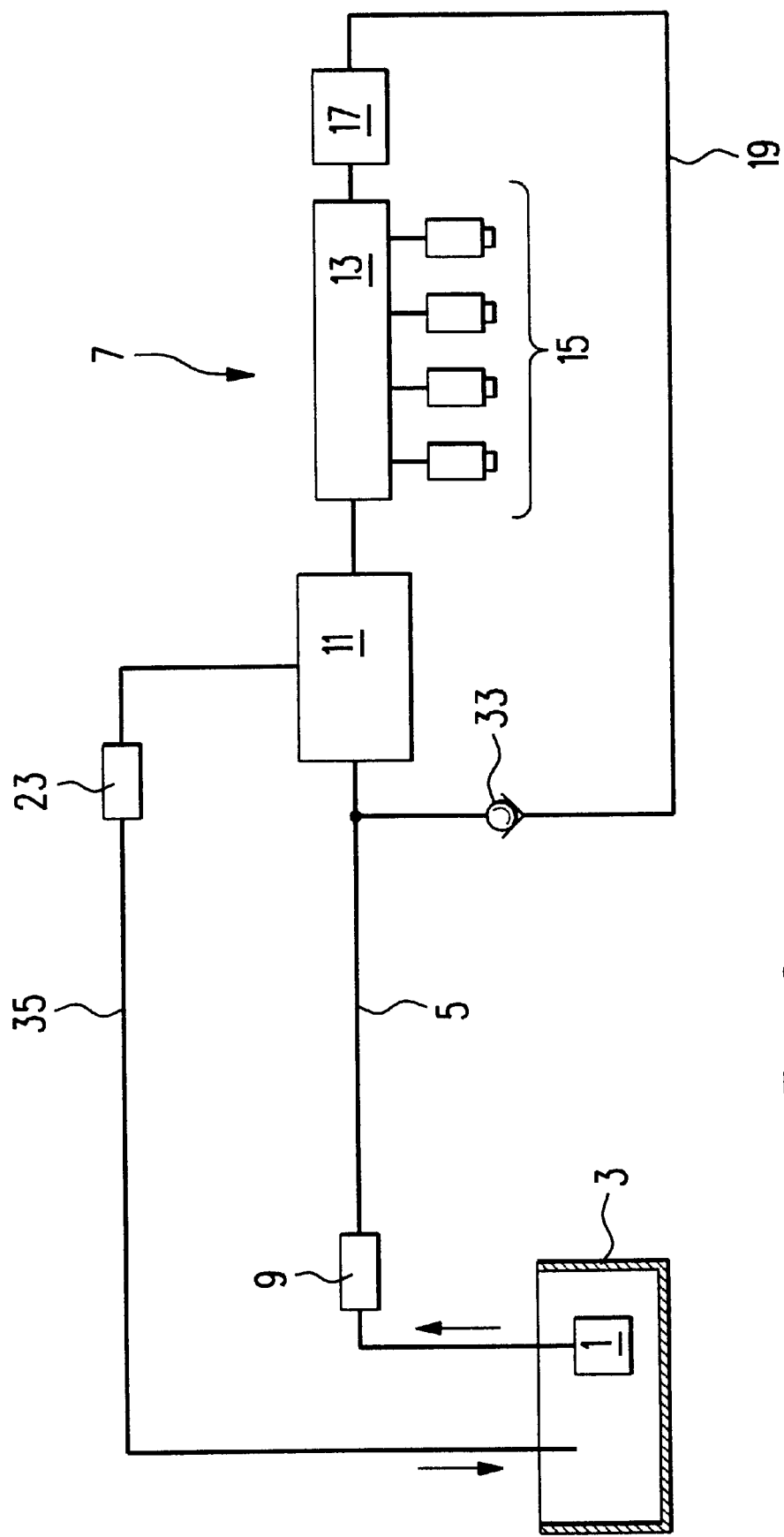
FIG. 2 schematically shows a second exemplary embodiment of a fuel injection system of the invention.

In FIG. 2, a second exemplary embodiment of a fuel injection system of the invention is shown. Identical components are identified by the same reference numerals, and what has been said for the first exemplary embodiment applies accordingly. In this exemplary embodiment, the return line 19 discharges into the feed line 5 upstream of the high-pressure pump 11. In the return line 19, a check valve 33 is provided, which prevents fuel from the feed line 5 from flowing directly into the return line 19. A leakage line 35 with a low-pressure regulator 23 branches off at the high-pressure pump 11 and discharges into the tank 3. As in the first exemplary embodiment, the low-pressure regulator 23 has the task of regulating a counterpressure. In this exemplary embodiment, continuous flushing of the high-pressure pump 11 with the full pumping quantity of the prefeed pump 1 takes place. The scavenging quantity in this operating state is not limited by a throttle. That is, each time the engine is started, the prefeed pump 1 is switched on, which pumps fuel into the feed line 5 and builds up the maximum pumping pressure level. This pumping level compresses any vapor bubbles that may be present. The excess fuel that is not used by the high-pressure region 7 flows back into the tank 3 via the leakage line 35, so that permanent scavenging and cooling of the high-pressure pump 11 is achieved in the simplest possible way.

In the exemplary embodiments shown, the high-pressure region 7 has a common rail 13, injectors 15, and a pressure control valve 17. However, the invention is not limited to common rail fuel injection systems but instead can be employed usefully in other fuel injection systems as well.

Figure 3:
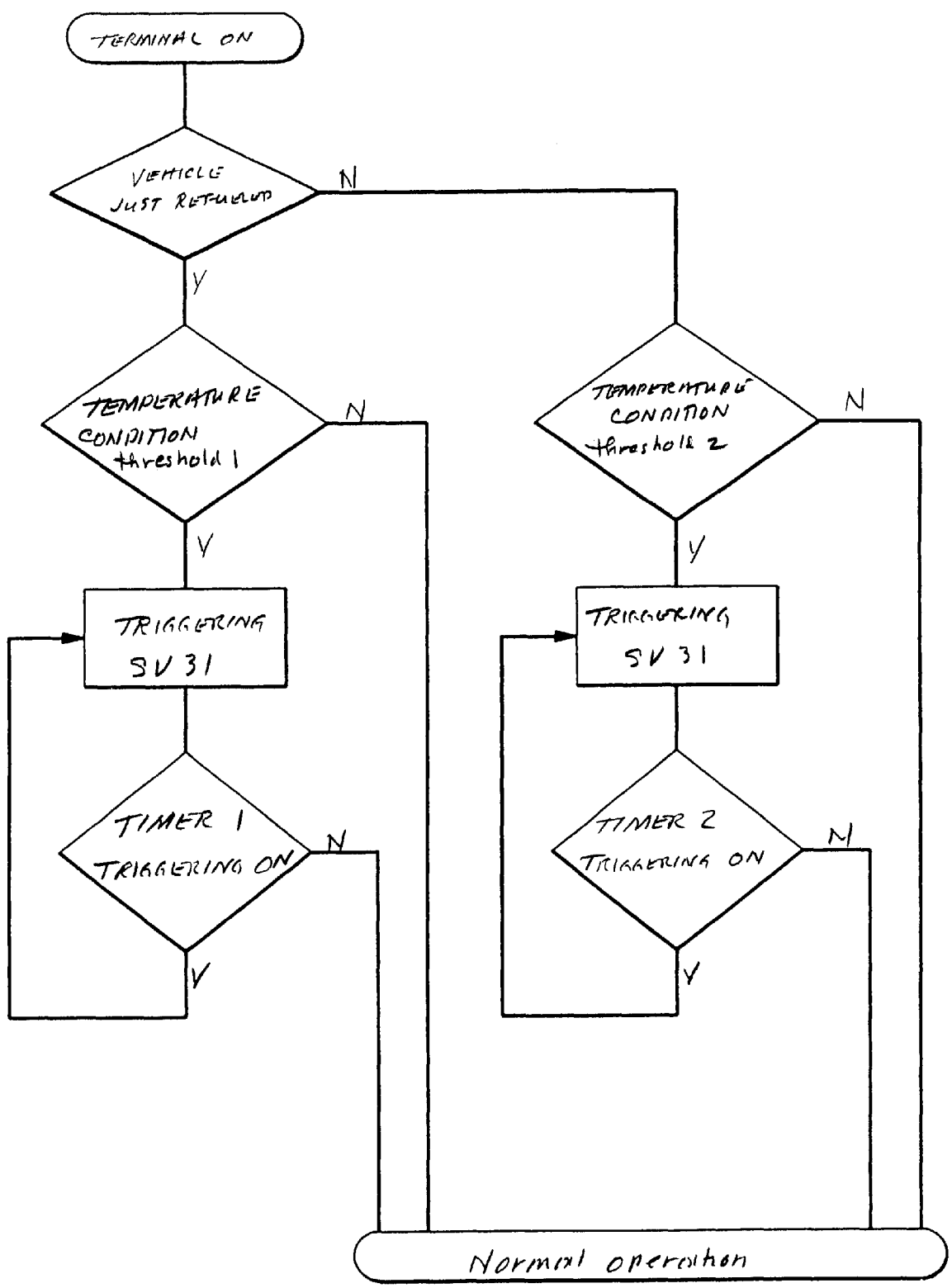
FIG. 3 is a flowchart for one exemplary embodiment of the method of the invention.

In FIG. 3, a block circuit diagram of one exemplary embodiment of a method of the invention for scavenging and cooling a fuel injection system is shown, in accordance with the first exemplary embodiment (FIG. 1). As soon as voltage is applied to the terminal of the vehicle, in a first interrogation operation it is checked whether the motor vehicle has just been refueled, or whether the fuel has been in the tank for a relatively long time. In the normal case, the fuel has already been in the tank for a relatively long time, so that the answer is then "No"(N). If this branch is then taken, a turn-on criterion is then checked, in the form of a temperature condition $T_{threshold\ 2}$.

If the temperature condition $T_{threshold\ 2}$ is not met (branch N), then the risk of vapor bubbles in the high-pressure region does not exist, and a shift to normal operation of the fuel injection system is made.

If the temperature condition $T_{threshold\ 2}$ is met, then the scavenging valve (or SV for short) 31 is triggered (branch Y); that is, the scavenging valve 31 is closed. In a subsequent interrogation operation, the triggering of a timer (timer 2) is checked. If the answer to the check is negative, then the fuel injection system shifts to normal operation. Otherwise, the scavenging valve 31 is kept closed.

Figure 4:
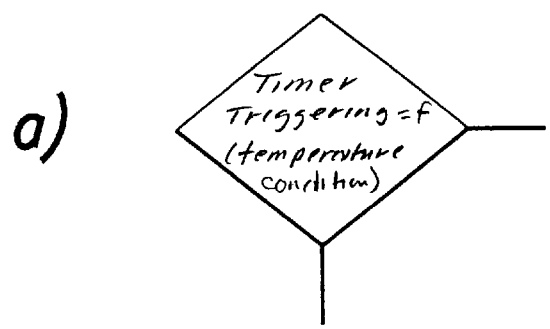
FIG. 4 shows alternative turn-on criteria.
Figure 4:
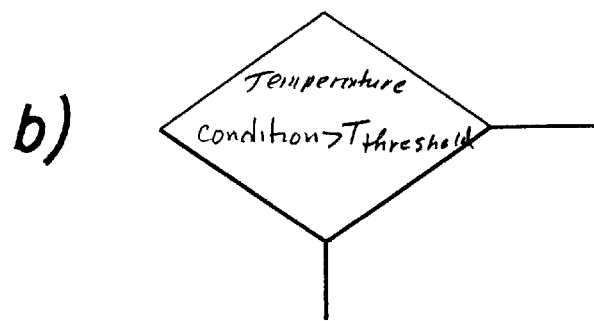
Figure 4:
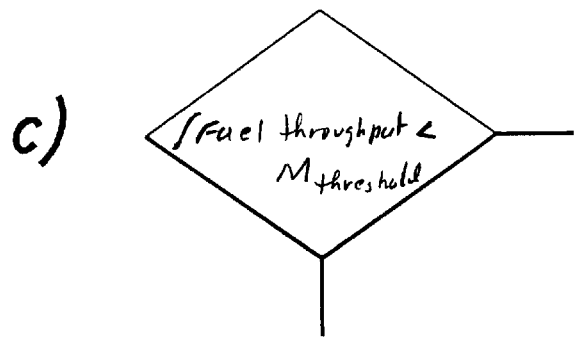
Figure 4:
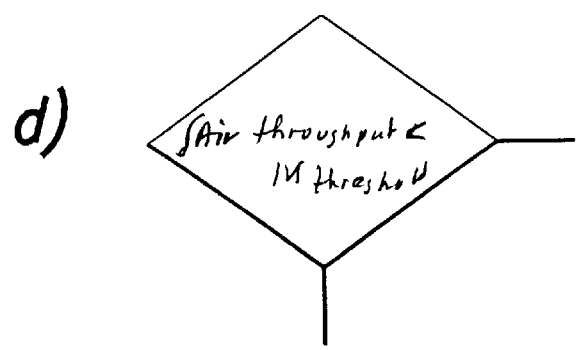

In FIG. 4, alternative turn-on criteria for triggering the timer are shown. In FIG. 4a, the triggering of the timer can be triggered as a function of a temperature condition. In FIG. 4b, the temperature condition can be such that the scavenging valve 31 continues to be triggered, if a measured or calculated temperature is greater than a temperature $T_{threshold}$.

In FIG. 4c, the scavenging valve can continue to be triggered if the integral of the pumped fuel is less than a threshold $M_{threshold}$.

In FIG. 4d, the scavenging valve can continue to be triggered if the integral of the air flow throughput is less than a threshold $M_{threshold}$.

In the case where the vehicle has just been refueled, then the left branch of the flow chart in FIG. 3 is taken. The essential distinction from the right branch in FIG. 3 is that the temperature condition $T_{threshold\ 1}$, which causes the closure of the scavenging valve 31, is different. The temperature condition $T_{threshold\ 1}$ is lower for a motor vehicle whose tank has just been filled, since the boiling temperature of fresh fuel is lower than that of fuel that has already been in the tank for some time.

It is understood that in a simplified embodiment of the invention, the question "Vehicle just refueled?" is dispensed with, and the temperature condition $T_{threshold\ 2}$ is always used instead.

The term "turn-on criterion" is understood in conjunction with the invention to mean a limit value that must be reached or exceeded in order to trip a scavenging operation. Measured or calculated temperatures, but also calculated variables, which result from the load state of the engine before it is turned off, or time intervals are all suitable as a turn-on criterion. The term "turn-off criterion" should be understood accordingly. As soon as a turn-off criterion is reached or exceeded, for instance if the temperature of the high-pressure pump drops below a certain limit value that for the sake of generalization is called a turn-off criterion, then the scavenging operation is terminated.

The foregoing relates to preferred exemplary embodiments of the invention, it being understood that other variants and embodiments thereof are possible within the spirit and scope of the invention, the latter being defined by the appended claims.

We claim:

1. A method for cooling a fuel injection system for internal combustion engines, having a prefeed pump (1) that pumps fuel from a tank (3) via a feed line (5) into a high-pressure region (7), the high-pressure region (7) including a high-pressure pump (11), a return line (19) for removing excess fuel from the high-pressure region (7), and a connecting line (29), connecting the feed line (5) and return line (19), the flow through the connecting line (29) being controllable by means of a scavenging valve (31), the method comprising, closing the scavenging valve (31), if upon turning on the engine a turn-on criterion has been reached;

scavenging of at least parts of the high-pressure region (7) with fuel from the fuel tank (3); and opening the scavenging valve (31), as soon as a turn-off criterion is reached.

2. The method according to claim 1, wherein, as the turn-on criterion, a characteristic temperature is employed.

3. The method according to claim 1, wherein the high-pressure region (7) includes a common rail (13), and, as the turn-on criterion, the temperature $T_{fuel}$ of the fuel in the high-pressure region (7), in particular in the high-pressure fuel pump (11) and/or in the common rail (13), or the temperature ($T_{component}$) of components of the fuel injection system, or the temperature ($T_{air}$) of the air in the surroundings of the high-pressure region (7) is employed.

4. The method according to claim 2, wherein the characteristic temperature ($T_{fuel}$, $T_{component}$, $T_{air}$) is measured.

5. The method according to claim 2, wherein the characteristic temperature ($T_{fuel}$, $T_{component}$, $T_{air}$) is calculated.

6. The method according to claim 1, wherein the opening of the scavenging valve (31) is effected with timing control.

7. The method according to claim 1, wherein the opening of the scavenging valve (31) is effected as a function of the course over time of the characteristic temperature ($T_{fuel}(t)$, $T_{component}(t)$, $T_{air}(t)$).

8. The method according to claim 1, wherein the time while the scavenging valve (31) remains closed is defined as a function of the characteristic temperature ($T_{fuel}$, $T_{component}$, $T_{air}$).

9. The method according to claim 1, wherein the scavenging valve (31) is opened as a function of the fuel quantity pumped by the prefeed pump (1) for scavenging purposes.

10. The method according to claim 1, wherein the scavenging valve (31) is opened as a function of the air flow rate aspirated by the engine since it was turned on.

11. The method according to claim 1, wherein the scavenging valve (31) is closed as soon as a voltage is applied to the terminal of the vehicle.

12. The method according to claim 1, wherein the turn-on criterion is reduced after the fuel tank has been filled.

13. The method according to claim 1, wherein a computer program is employed for controlling the steps of the method.

14. The method according to claim 13, wherein the computer program is stored in the memory in a storage medium.

15. The method according to claim 1, wherein a control unit (31) for a fuel injection system of an internal combustion engine is employed for performing the method.

16. A fuel injection system for internal combustion engines, comprising a control unit, a prefeed pump (1) that pumps fuel from a tank (3) via a feed line (5) into a high-pressure region (7), the high-pressure region (7) including at least one high-pressure pump (11), a return line (19) for removing fuel from the high-pressure region (7), the return line (19) having a relief throttle (21) and a low-pressure regulator (23), characterized in that a connecting line (29) with a scavenging valve (31) and a mixing line (25) with a check valve (27) are located between the feed line (5) and the return line (19), the mixing line (25) discharging into the return line (19) upstream of the connecting line (29), and the connecting line (29) discharging into the return line (19) upstream of the low-pressure regulator (23).

17. The fuel injection system according to claim 16, further comprising a relief throttle (21) between the discharge point of the mixing line (25) and connecting line (29) into the return line (19), said check valve (27) being loaded by a spring.

18. The fuel injection system according to claim 16, wherein the scavenging valve (31) is opened when without current.

19. The fuel injection system according to claim 17, wherein the scavenging valve (31) is opened when without current.

20. A fuel injection system for internal combustion engines, comprising a control unit, a prefeed pump (1) that pumps fuel from a tank (3) via a feed line (5) into a high-pressure region (7), the high-pressure region (7) including at least one high-pressure pump (11), a return line (19) for removing fuel from the high-pressure region (7), the return line (19) discharging into the feed line (5), and having a leakage line (35) for removing fuel from the high-pressure region into the tank (3), and a check valve (33) in the return line (19), and a low-pressure regulator (23) being disposed in the leakage line (35).

21. The fuel injection system according to claim 16, wherein the high-pressure region (7) includes a common rail (13) and a pressure regulating valve (17), and wherein the pressure regulating valve (17) regulates the pressure in the common rail (13) by diverting fuel out of the common rail (13) into the return line (19).

22. The fuel injection system according to claim 20, wherein the high-pressure region (7) includes a common rail (13) and a pressure regulating valve (17), and wherein the pressure regulating valve (17) regulates the pressure in the common rail (13) by diverting fuel out of the common rail (13) into the return line (19).

23. The fuel injection system according to claim 16, comprising at least one temperature sensor, said temperature sensor being operable to ascertain the turn-on criterion or criteria or the turn-off criterion or criteria.

24. The fuel injection system according to claim 20, comprising at least one temperature sensor, said temperature sensor being operable to ascertain the turn-on criterion or criteria or the turn-off criterion or criteria.

* * * * *